(12) United States Patent
Abinal et al.

(10) Patent No.: US 6,564,842 B2
(45) Date of Patent: May 20, 2003

(54) LIGHTENED SAFETY SUPPORT FOR TIRE

(75) Inventors: Richard Abinal, Veyre-Monton (FR); Sebastien Drap, Dallet (FR); Jean-Jacques Drieux, Volvic (FR); Francois Hottebart, Royat (FR); Adam Jara, Clermont-Ferrand (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 10/008,198

(22) Filed: Dec. 7, 2001

(65) Prior Publication Data

US 2002/0124924 A1 Sep. 12, 2002

Related U.S. Application Data

(63) Continuation of application No. PCT/EP00/05095, filed on May 5, 2000.

(30) Foreign Application Priority Data

Jun. 10, 1999 (FR) .............................. 99 07469

(51) Int. Cl.[7] .................. B60C 17/00; B60C 17/02; B60C 15/06; B60B 21/02
(52) U.S. Cl. ................ 152/516; 152/520; 152/381.6
(58) Field of Search .................... 152/5, 7, 11, 12, 152/381.6, 400, 516, 520

(56) References Cited

U.S. PATENT DOCUMENTS

| | | | | |
|---|---|---|---|---|
| 2,603,267 A | * | 7/1952 | Simpson ................. | 152/7 |
| 2,686,549 A | * | 8/1954 | Henry ..................... | 152/7 |
| 3,509,928 A | | 5/1970 | Aghnides | |
| 4,293,016 A | | 10/1981 | Bible et al. | |
| 4,784,201 A | | 11/1988 | Palinkas et al. ......... | 152/323 |
| 5,265,659 A | * | 11/1993 | Pajtas et al. ............ | 152/323 |
| 5,891,279 A | | 4/1999 | Lacour | |
| 6,039,099 A | | 3/2000 | Muhlhoff | |
| 6,092,575 A | | 7/2000 | Drieux et al. | |
| 6,170,544 B1 | | 1/2001 | Hottebart | |
| 6,279,630 B1 | * | 8/2001 | Herbert IMS ........... | 152/17 |
| 2001/0052378 A1 | * | 12/2001 | Masson et al. | |

FOREIGN PATENT DOCUMENTS

| | | |
|---|---|---|
| EP | 0159888 | 10/1985 |
| EP | 0836957 | 4/1998 |
| JP | 3082601 | 4/1991 |
| JP | 7032827 | 2/1995 |

OTHER PUBLICATIONS

English Abstract for EP 836957A.
Patent Abstracts for Japan, vol. 15, No. 253 (M–1129), Jun. 27, 1991 (corresponding to JP 03 082601).
Patent Abstracts of Japan, vol. 1995, No. 05, Jun. 30, 1995 (corresponding to JP 07 032827).
International Search Report corresponding to PCT/EP00/05095.

* cited by examiner

*Primary Examiner*—S. Joseph Morano
*Assistant Examiner*—Jason R. Bellinger
(74) *Attorney, Agent, or Firm*—Baker Botts L.L.P.

(57) ABSTRACT

The invention concerns a light safety support (1) for a tire comprising a base (2), a top (3) and an annular linking body (4) with a continuous support element around the circumference and a circumferential median plane, wherein the support element includes a plurality of partitions (13), (23) extending axially on either side of the circumferential median plane that are adapted in their central part relative to their lateral end parts to reinforce the support buckling strength under a radial load.

16 Claims, 9 Drawing Sheets

LIGHTENED SAFETY SUPPORT FOR TIRE

SPECIFICATION

This application is a continuation of international application PCT/EP00/05095, filed Jun. 5, 2000 and published as WO 00/76791 A1 in French on Dec. 21, 2000, which claims priority of French application 99/07469, filed Jun. 10, 1999.

BACKGROUND OF THE INVENTION

The present invention concerns safety supports for vehicle tires that are mounted inside the tires on the wheel rims in order to bear the load in case of tire failure or abnormally low pressure.

Patent application EP 0,796,747 A1 discloses a safety support made essentially of a resilient elastomeric material having a generally cylindrical base, a generally cylindrical crown and an annular body connecting the base and the crown. The annular body includes, on the side intended to be placed toward the outside of the vehicle, a plurality of recesses extending generally axially to at least the middle of the body without crossing it. The annular body is thus designed to bear the load on compression in its solid part and on buckling in its recessed part.

Although the foregoing safety support affords numerous advantages, excellent shock resistance and a very good lifetime under load, and provides a remarkable behavior for a vehicle running with at least one of its tires bearing on its safety support, it is relatively heavy.

Patent application JP 3-82601 proposes, notably, a safety support intended to be mounted on the rim inside a vehicular tire in order to support the tread of that tire in case of loss of inflation pressure. That safety support includes a generally cylindrical base intended to fit around the rim, a generally cylindrical crown intended to come in contact with the tread in case of pressure loss, and leaving a clearance from the latter at nominal pressure, and an annular body connecting the base and the crown. The annular body contains a circumferentially continuous support member having a circumferential median plane. The support member includes a plurality of partitions extending axially on both sides of the circumferential median plane and distributed about the circumference of the support, and connecting members extending generally circumferentially and joining the two ends on the same side of the support of two adjacent partitions, such connecting members being successively arranged alternately on both sides of the partitions. The partitions and connecting members are generally rectilinear. The difference between the maximum and minimum values of the area of an axial section of the support member as a function of the azimuth, related to the sum of those same areas, is preferably less than 0.3. Consequently, as a function of the azimuth, the area of an axial section of the support member varies at most by a factor of 2 in order to provide good load capacity uniformity and to limit the vibrations on running flat. The support of application JP3-82601 is made essentially of a hard polymeric material and the whole support member is designed to bear the compression load.

SUMMARY OF THE INVENTION

The object of the invention is to provide a safety support which, while affording a comparable lifetime, provides improved performance relative to the prior art in respect of the weight of the support.

The safety support according to the invention is intended to be mounted on the wheel rim inside a tire equipping a vehicle in order to support the tread of the tire in case of loss of inflation pressure. The safety support includes a generally cylindrical base intended to fit around the rim, a generally cylindrical crown intended to come in contact with the tread in case of pressure loss, and leaving a clearance from the latter at nominal pressure, and an annular body connecting the base and the crown. The annular body contains a circumferentially continuous support member having a circumferential median plane, which support member has a plurality of partitions extending axially on both sides of the circumferential median plane and distributed about the circumference of the support, and connecting members extending generally circumferentially and joining the two laterally adjacent ends (on the same side of the support) of two circumferentially adjacent partitions, such connecting members being successively arranged alternately on both sides of the partitions. In accordance with the invention, the ratio of the thickness of the partitions in the central part H thereof to the thickness of their lateral ends h is greater than 1.1, and preferably greater than 1.5, in order to reinforce the buckling resistance under a radial load on the annular body.

The invention also concerns a similar support in which the partitions present, from one lateral end to the other, at least one reversal of direction of their curvature in order to reinforce the buckling resistance under a radial load of the annular body.

More specifically, the central part of each partition of the support member is separated from the connecting members and can be destroyed in the course of running flat upon the occurrence of a repeated buckling strain. In the case of supports made essentially of an elastomeric material, the occurrence of such repeated buckling strain during running results in the initiation and propagation of fissures in the side of the extended walls of the support. On the other hand, in the case of supports made essentially of plastics, a buckling strain results in the appearance of plastic deformations. Those irreversible deformations considerably reduce the strength of the structure and its load-bearing capacity, and progressively render it unfit to fulfill its function.

According to the first embodiment of the invention, the ratio between the thickness of the partitions in the center part H thereof to the thickness in their lateral ends h is greater than 1.1 and preferably greater than 1.5. This variation of thickness very appreciably strengthens the buckling resistance of the center part of the partitions, and thus makes it possible, at a given radial load, to limit the thickness of the connecting members and to lighten the total weight of the support.

According to the second embodiment, the partitions include, from one lateral end thereof to the other, at least one reversal, and preferably three reversals, of direction of their curvature.

According to one working example, the partitions include a central part extending generally axially between two lateral parts, which lateral parts join the connecting members by forming an angle γ with the circumferential direction ranging between 20 and 40 degrees.

According to another working example, the partitions present, in their central zone, two generally axially extending parts that are circumferentially offset from each other, as well as a third connecting part. The mean orientation variation a between that third connecting part and the two parts of generally axial orientation is preferably greater than 20 degrees.

Each connecting member can be backed by at least one wall extending generally axially toward the outside of the annular body. Such wall or walls can be placed on just one side or on both sides of the support member. Because these axial walls are integral with the support member and are relatively short, they are not very sensitive to buckling. Such axial walls make it possible, at an equal support width, to reduce the width of the support member and, therefore, increase its buckling resistance.

In a preferred embodiment, each connecting member forms, with an axial wall backing it and the lateral ends of the two adjacent partitions, a star-shaped assembly with three branches. Preferably, the axial width of the axial backing wall is less than or equal to half the axial width of the two adjacent partitions of the support member.

The support members, according to the invention, can also contain a generally cylindrical web coaxial with the support and placed radially, for example, at mid-height, of the support member. The web is made of the same material as the rest of the annular body. When placed at mid-height, the web divides the height of the partitions in two and thus increases the limiting buckling load by a factor of four.

To facilitate construction of the supports according to the invention, the different geometries of the support members are configured to exclude any undercut part that would impede axial stripping of the support.

The supports according to the invention can be made essentially of very different materials.

According to a first example, a natural or synthetic rubber-based compound may be used. In that case, the modulus of elasticity of the compound preferably ranges between 8 and 30 MPa. The modulus of elasticity is understood to be a secant modulus of extension obtained on a deformation on the order of 10% at ambient temperature in the third stress cycle. A support made with such materials and the above-described geometries according to the invention can be half the weight of a support such as described in application EP 0,796,747 A1, while maintaining completely acceptable behavioral performances and running lifetime.

According to a second example, an elastomeric polyurethane can be used. An advantage of that material is that it affords a higher moduli of elasticity, ranging, for example, between 20 and 150 MPa, with limited self-heating on running. By comparison with the support of application EP 0,796,747 A1, that makes it possible to obtain a weight reduction factor greater than 3, while maintaining excellent shock resistance by reason of high breaking elongations, e.g., greater than 100%.

Thermoplastic polymers can also be used, preferably without rigid reinforcing fillers such as balls or fibers. Although such reinforcing fillers make it possible to increase the rigidity of those materials appreciably, they generally reduce the shock resistance unacceptably for good performance of a safety support. The Izod test toughness of such materials at −30° C. is preferably greater than 10 kJ/m² and the breaking elongation is preferably greater than 50%. For example, a polyamide doped with elastomeric particles (such as ZYTEL ST 801), a thermoplastic elastomer (TPE) or a thermoplastic polyurethane (TPU) can be used.

Another material advantageous for supports according to the invention is a polyurethane containing rigid reinforcing fillers such as balls or fibers. Such material makes it possible to attain moduli of elasticity higher than those of the elastomeric polyurethanes, while maintaining acceptable shock properties.

BRIEF DESCRIPTION OF THE DRAWINGS

Several embodiments of supports according to the invention are now described with reference to the attached drawings, in which.

DESCRIPTION OF ILLUSTRATIVE EMBODIMENTS

Figure 1:
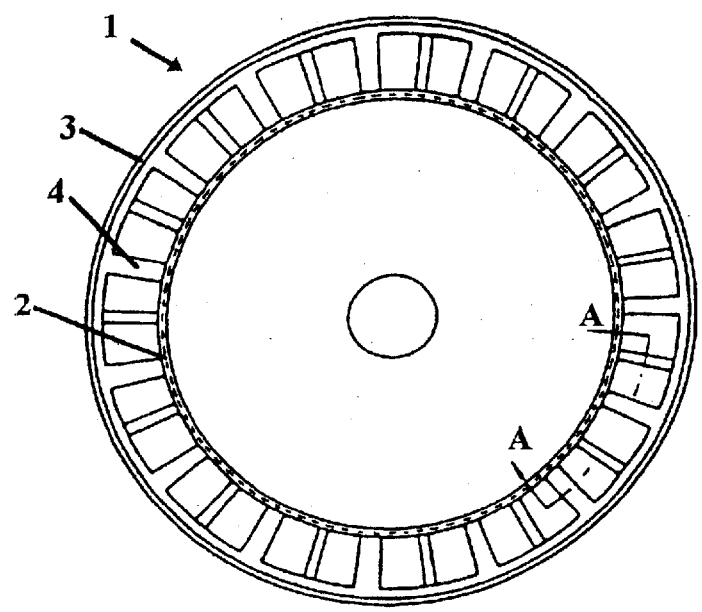
FIG. 1 is a side view of a safety support.
Figure 2:
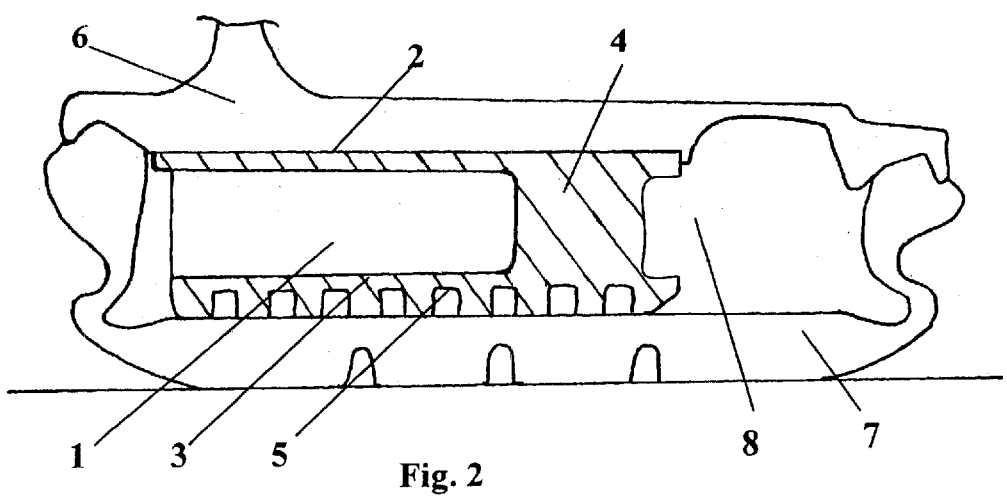
FIG. 2 is an axial section of the support of FIG. 1 mounted on a wheel rim and bearing on a tire.

FIGS. 1 and 2 present, in side view and in axial section, an embodiment of a safety support 1 according to the invention. That support includes basically three parts: a generally ring-shaped base 2; a generally annular crown 3 with, optionally, longitudinal grooves 5 on its radially outer wall; and an annular body 4 connecting the base 2 and the crown 3.

The safety support 1 is intended to be mounted around a rim 6, as shown in FIG. 2, and inside the cavity 8 of a corresponding tire 7. The rim 6 shown in FIG. 2 is described in more detail in the aforementioned patent application EP 0,796,747 A1. FIG. 2 illustrates the function of the support 1, which is to support the tread of the tire in the event of severe inflation pressure loss of the tire.

Figure 3:
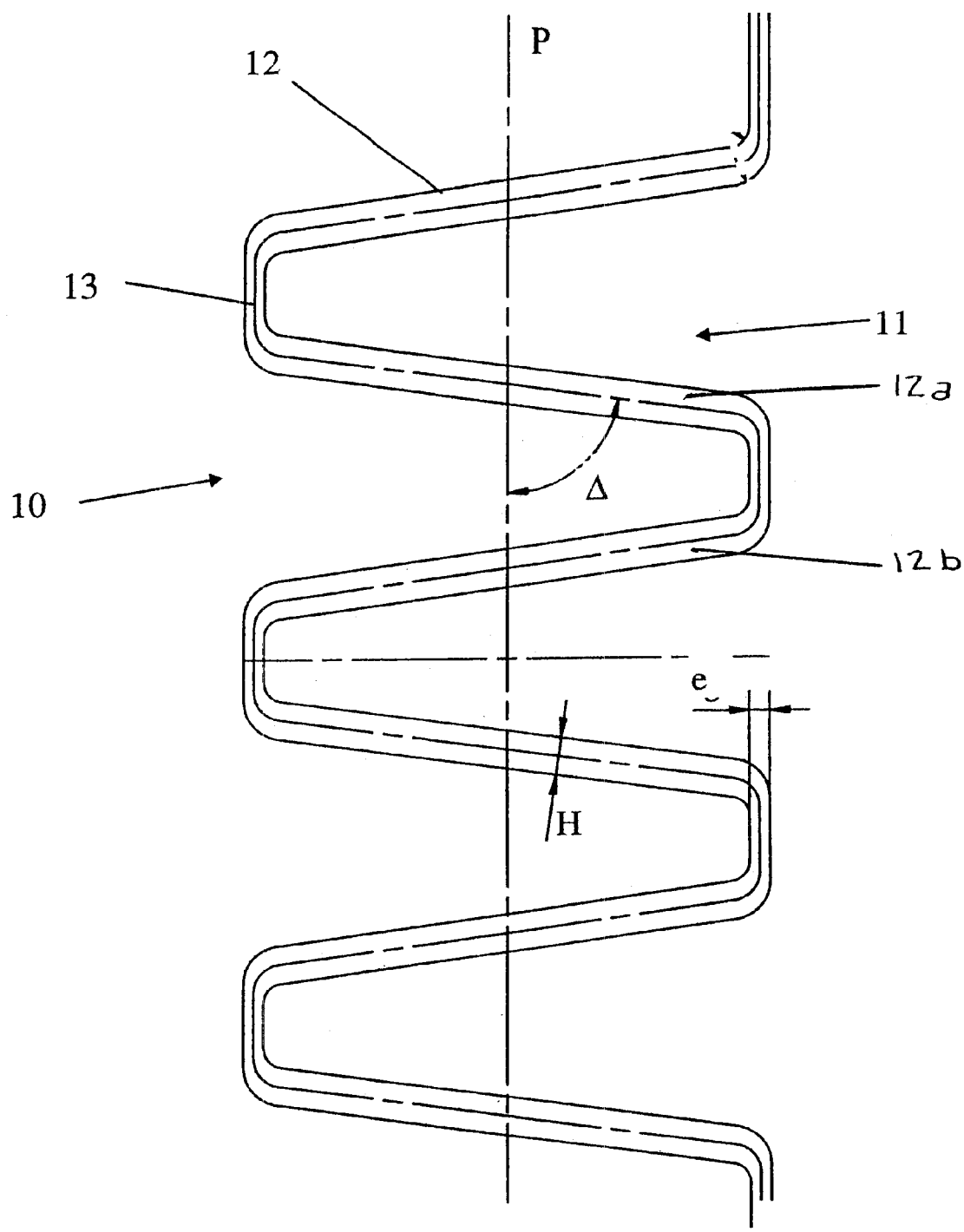
FIG. 3 is a sectional view, taken along the line A—A in FIG. 1, of a support member containing partitions joined by alternate circumferential connecting members.

FIG. 3 shows one embodiment 10 of the annular body 4 of FIG. 2. FIG. 3 is a sectional view taken along the line A—A indicated in FIG. 1. The annular body 10 comprises a circumferentially continuous support member 11, which includes a set of partitions 12 joined in pairs by connecting members 13.

The partitions 12 extend laterally on both sides of the circumferential median plane P of the support member 11 and are evenly distributed about the circumference of the support. The partitions have an inclination Δ relative to the circumferential direction of approximately 90 degrees and are of a substantially constant thickness H. As shown in FIG. 3, adjacent partitions 12 have an opposite inclination relative to the axial direction. The connecting members 13 have a thickness e. They are circumferentially oriented and connect the axially, or laterally, adjacent ends 12a and 12b, i.e., the ends located on the same side of the support, of circumferentially adjacent partitions 12. The connecting members 13 are thus successively arranged alternately on both axial sides of the partitions 12. Preferably, the support member 11 does not contain any undercut member, in order to facilitate fabrication of the support via axial stripping.

The support member 11 of FIG. 3 behaves inadequately on running flat. It is observed that the central part of the partitions 12 is too sensitive to buckling. Optimization between the thickness of the walls of the support member and the resultant weight of the support is unsatisfactory.

Figure 4:
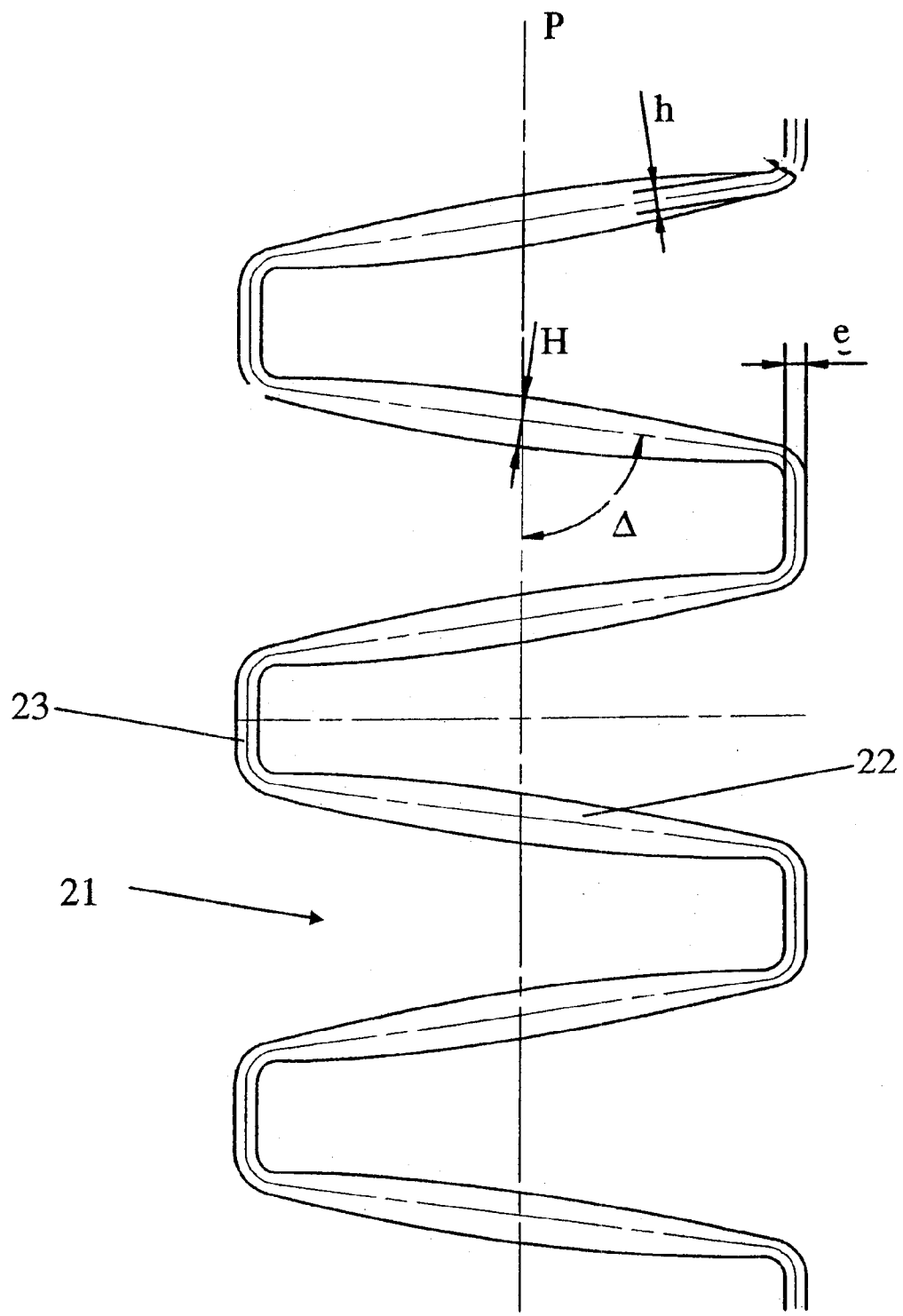
FIG. 4 is a sectional view similar to FIG. 3 of a support member in which the partitions have a variable thickness.

FIG. 4 depicts a section similar to that of FIG. 3 of a support member 21 according to the invention. The partitions 22 of the support member 21 have a thickness H in their central part that is greater than the thickness h at their lateral ends. In the example shown, H is approximately twice as great as h. That variation in thickness gives the central parts of the partitions very good buckling resistance. The lateral ends of the partitions 22 are joined to the connecting members 23 continuously and, therefore, have very good buckling resistance. A 10% variation in thickness between H and h can already have appreciable effects in delaying the appearance of buckling upon overload. The number of partitions 22 in such a support is preferably on the order of 30 to 80 about the circumference of the tire.

Figure 5:
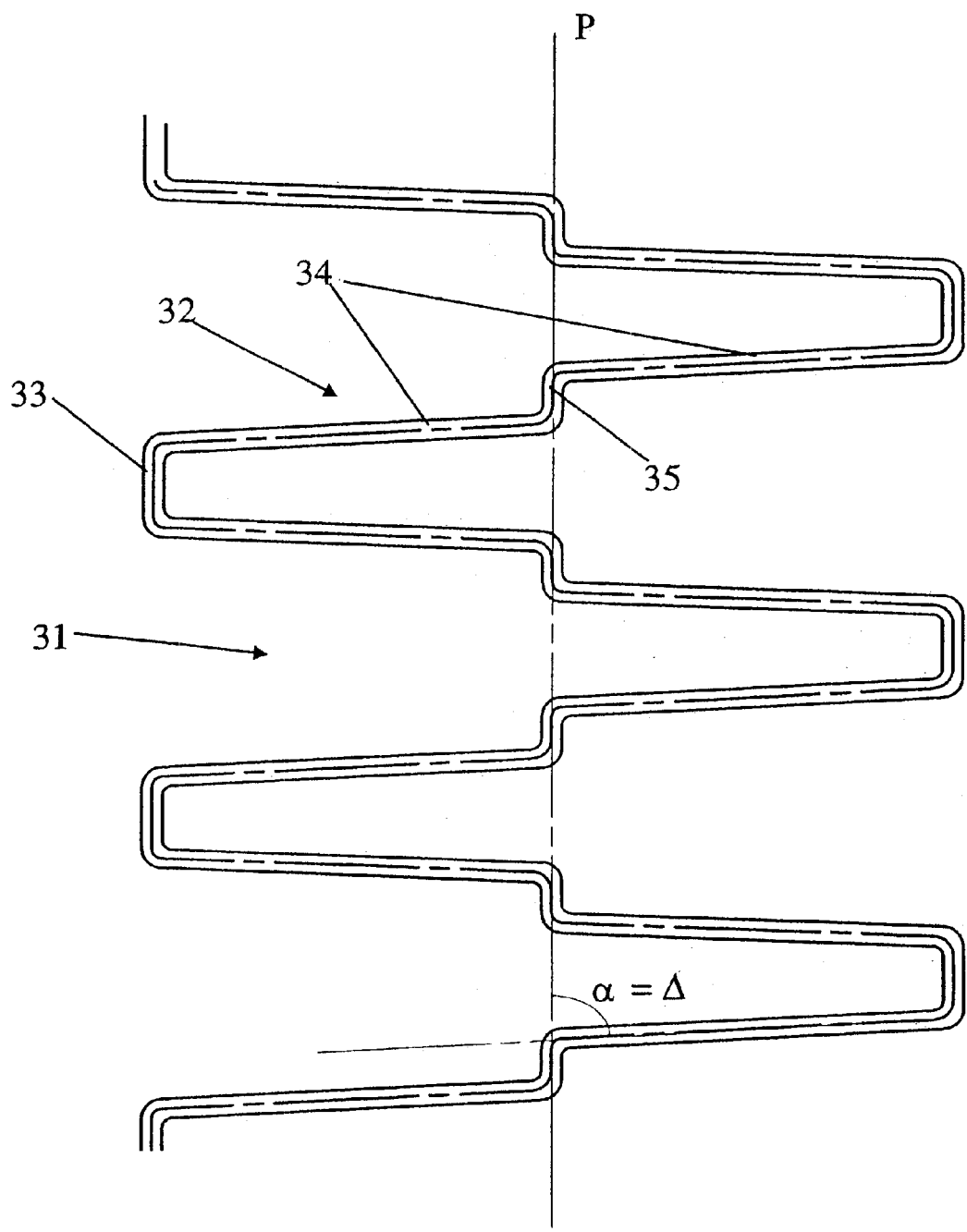
FIG. 5 is a sectional view similar to FIG. 3 of a support member in which the partitions contain a circumferentially oriented central connecting part.

FIG. 5 illustrates a section similar to that of FIG. 3 of a second embodiment of the support member. The support member 31 includes, as previously, a set of partitions 32 joined by connecting members 33. The partitions 32 contain two lateral parts 34 of the same inclination Δ relative to the circumferential direction, but which are offset circumferentially and joined in the central part of the support member 31 by a third part 35 of generally circumferential orientation. As configured in FIG. 5, the mean orientation variation α between the lateral parts 34 and the center part 35 is on the order of 80 degrees. As the parts 35 are of circumferential orientation, angles α and Δ are equal in FIG. 5. The presence of the third center part 35 of a mean orientation very different from that of the two lateral parts 34, 35 reinforces the buckling resistance of the center part of the partitions 22. The variation α, in order to be effective, should be greater than 20 degrees. In this working example, the partitions 32 embrace, from one lateral end to the other, one reversal of direction of their curvature.

Figure 6:
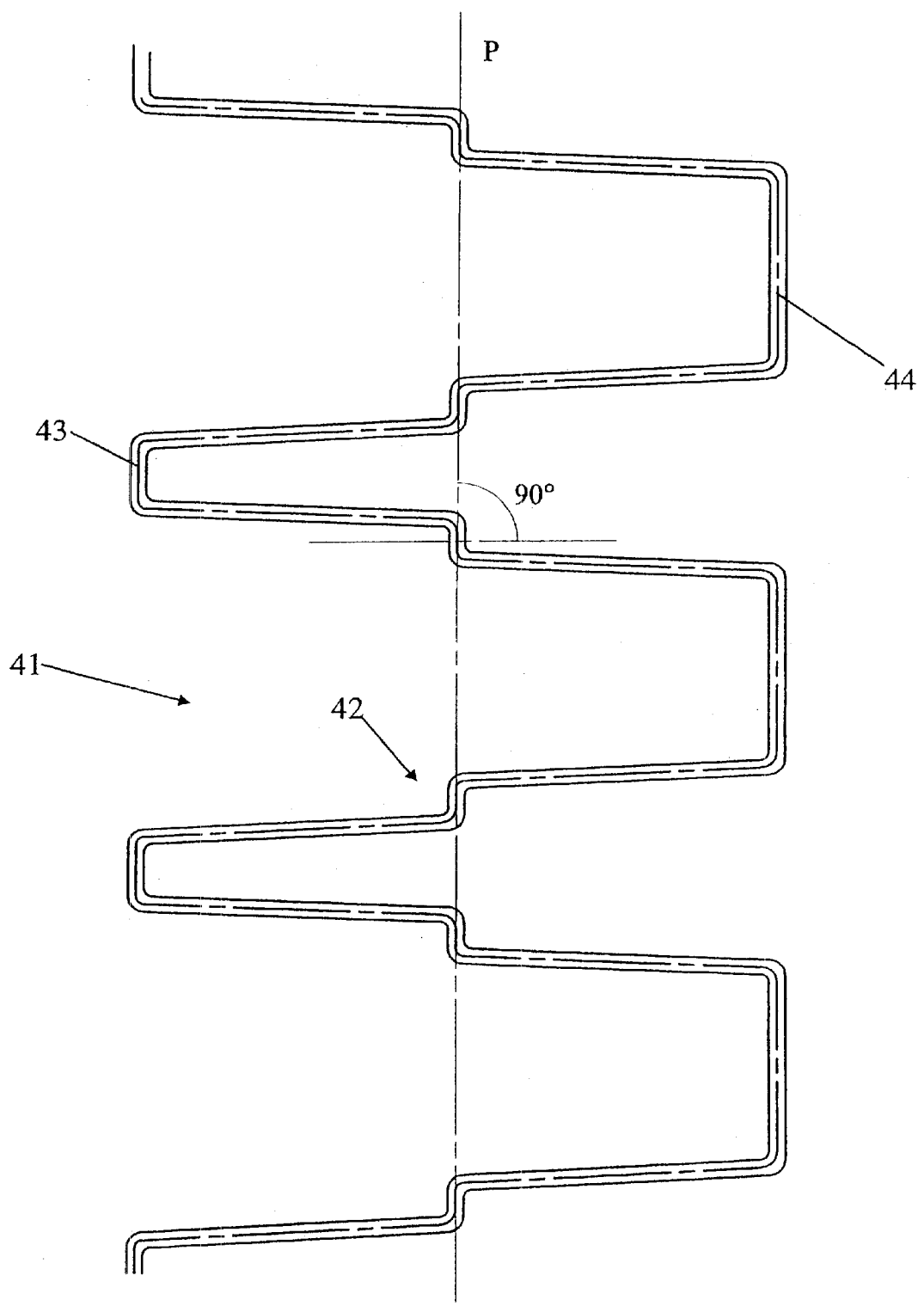
FIG. 6 is a sectional view similar to FIG. 3 of a support member in which the circumferential connecting members have a variable length.

FIG. 6 presents a third embodiment of a support member 41 according to the invention. In that embodiment, the connecting members 43 placed on a first axial side of the support member 41 have a circumferential length less than that of the connecting members 44 placed on the other axial side of the support member 41. In the example shown, the connecting members 44 are roughly double the length of the connecting members 43. The roughly doubled length of the support members 44 increases the compression strength of the support member 41 on that side of the support. The strengthened side should be arranged on the inner side of the vehicle, where the stresses sustained by the support in operation are greatest.

Figure 7:
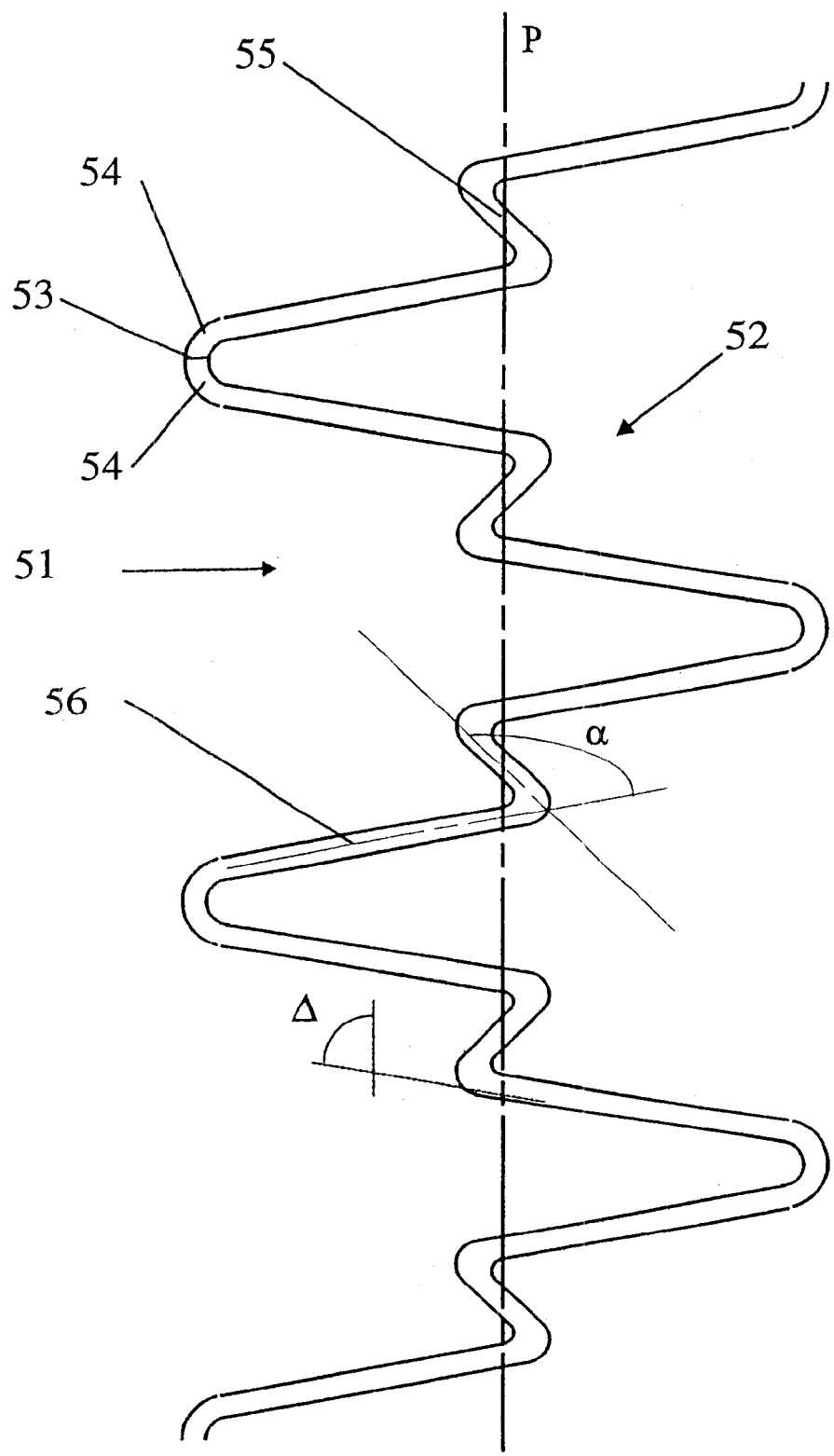
FIG. 7 is a sectional view similar to FIG. 3 of a support member in which the partitions present three reversals of curvature over their width.

FIG. 7 illustrates a fourth embodiment of a support member 51. In that embodiment, the connecting members 53 are practically reduced to the surface of contact between the two arc-shaped lateral ends 54 of the partitions 52. The partitions 52 also contain a connecting central part 55. The mean orientation variation α between the two lateral parts 56 and the central part 55 is greater than 90 degrees and, as shown, is on the order of 110 degrees. That increases the average support density of the support member 51 in its central region. The partitions 52 embrace, from one lateral end to the other, three reversals of their direction of curvature.

Figure 8:
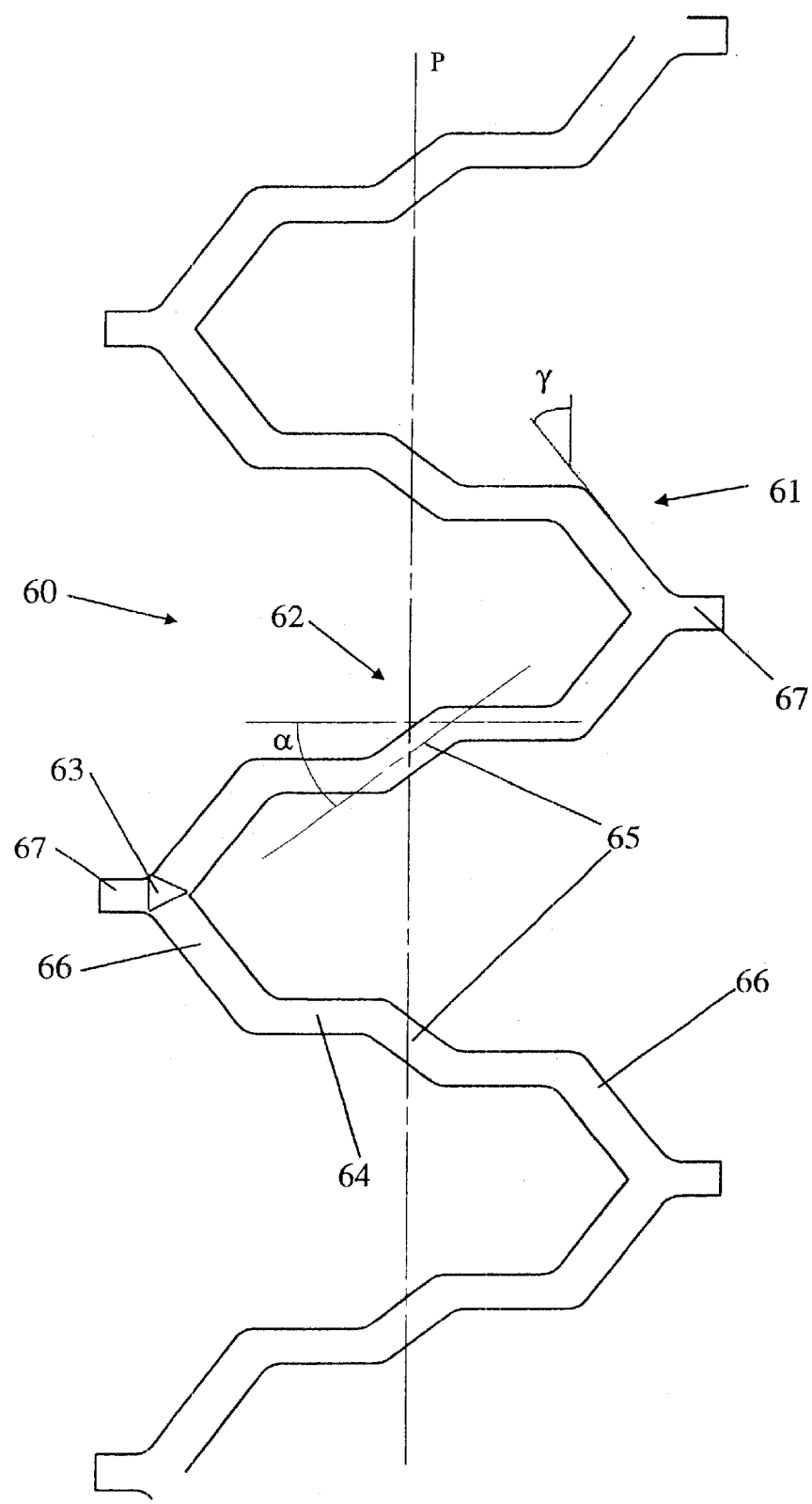
FIG. 8 is a sectional view similar to FIG. 3 of an annular body having an embodiment of a support member whose partitions present three reversals of curvature over their width.

FIG. 8 illustrates an embodiment similar to that of FIG. 7, but with the following modifications. The partitions 62 contain rectilinear segments 64, 65, 66 and present three reversals of direction of curvature. The rectilinear segments comprise two lateral parts 64 of axial orientation that are joined on one side by a center part 65 and on the other side by lateral end parts 66 of mean orientation γ of, preferably, approximately 30 degrees relative to the circumferential direction. The lateral end parts 66 are joined at their laterally outer ends to the connecting members 63. The mean orientation variation a between the two parts 64 of axial orientation of the partitions 62 and the center connecting parts 65 is preferably on the order of 40 degrees.

The connecting members 63 can be defined as members of roughly triangular section placed between two adjacent lateral end parts 66. On both sides of the support member 61, the annular body 60 comprises a set of walls of generally axial orientation 67 which extend each connecting member 63 toward the outside of the support. Each assembly of the connecting member 62, the adjacent lateral end parts 66 and the axial wall 67 thus has a star shape with three branches very resistant to buckling.

Figure 9:
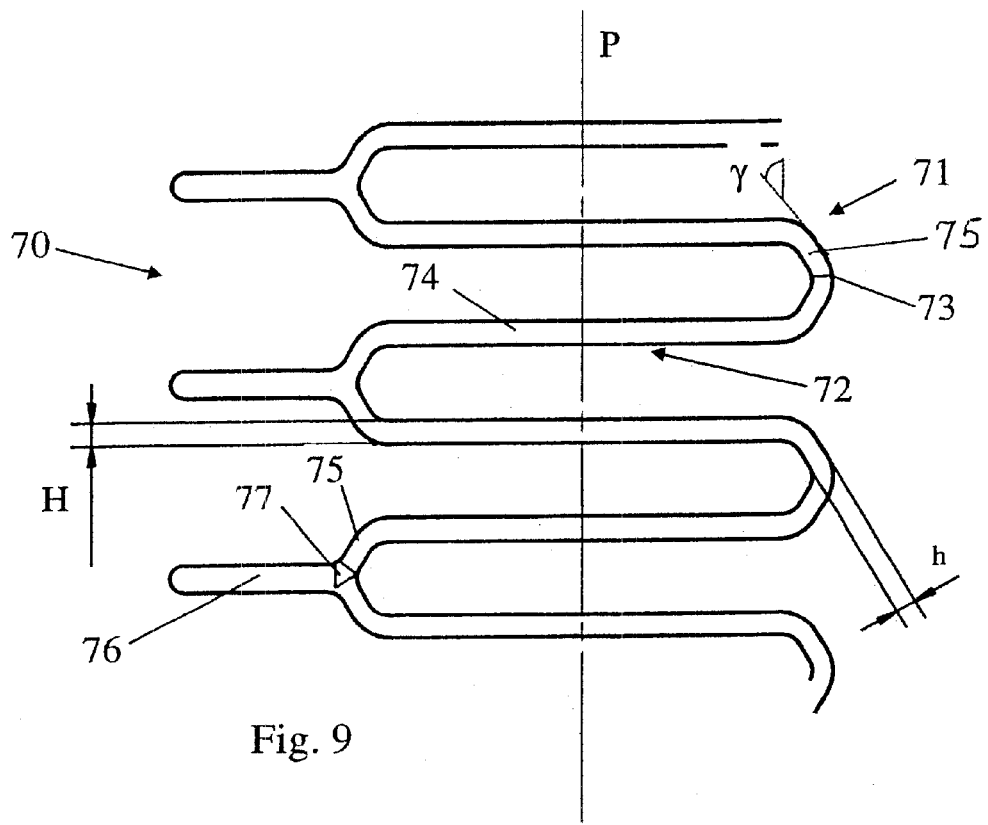
FIGS. 9 and 10 are sectional views similar to FIG. 3 of annular bodies with support members whose partitions have variable thicknesses and axial backing walls.

FIG. 9 shows another embodiment of an annular body 70. The support member 71 comprises partitions 72 with central parts 74 of axial orientation extended on both sides by a lateral end 75 of orientation γ close to 30 degrees relative to the circumferential direction. The connecting members 73 are reduced, on one side of the annular body 70, to the surface of contact between the two adjacent lateral end parts 75. On the other side, the annular body 70 contains lateral walls 76 which back the connecting members 77 on that side. The connecting members 77 are generally triangular, as illustrated at the bottom of FIG. 9. On that side, the compression strength of the support member is greater. The length of the lateral walls 76 is preferably less than half the length of the central parts 74 of the partitions 72, so that they are not likely to buckle. The side of the support member whose radial compression strength is greatest is to be placed on the inner side of the vehicle, because it has been observed that the stresses are greatest on that side of the vehicle. The partitions 72 have a thickness H in their central part 74 that is greater than the thickness h of their lateral end parts 75 in order to reinforce the buckling resistance of the central part 74.

Figure 10:
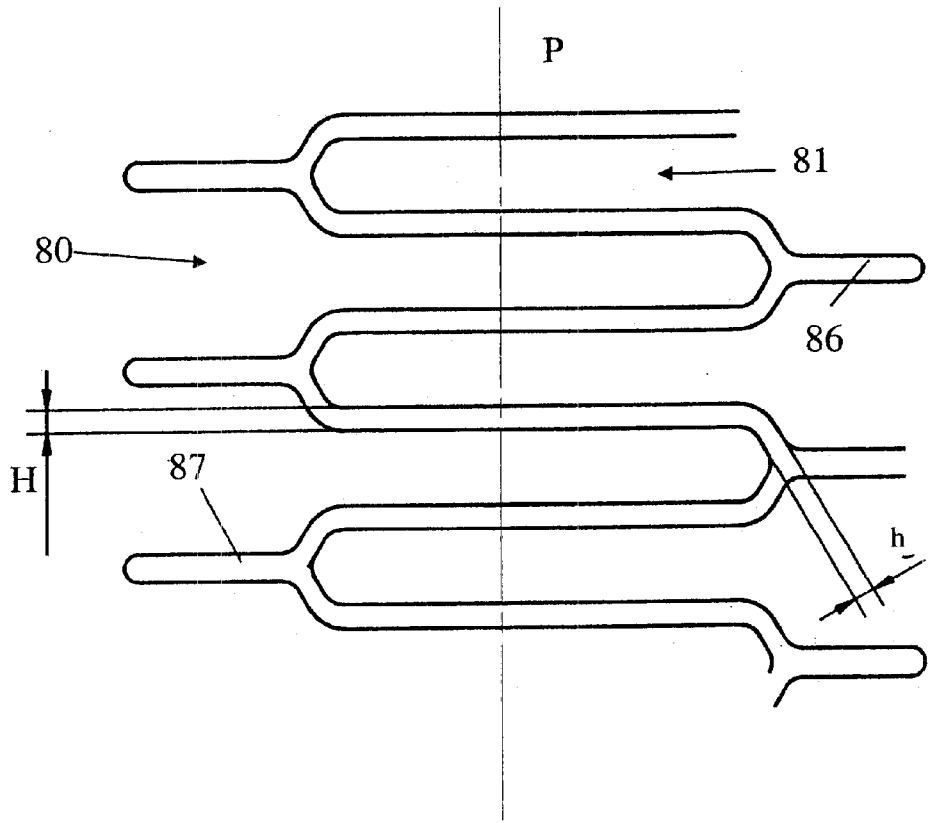

FIG. 10 depicts an annular body 80 very much like that of 70 of FIG. 9. The annular body 80 contains axial walls 86 and 87 which back the support member 81 on both sides, very much as the walls 76 back the support member 71. For a given width of the annular body 80, the side walls 86, 87 have the advantage of reducing the axial width of the partitions of the continuous support member and, thus, of improving the buckling resistance of the entire structure. The axial lengths of walls 86 and 87 can, as illustrated in FIG. 10, be different.

Figure 11:
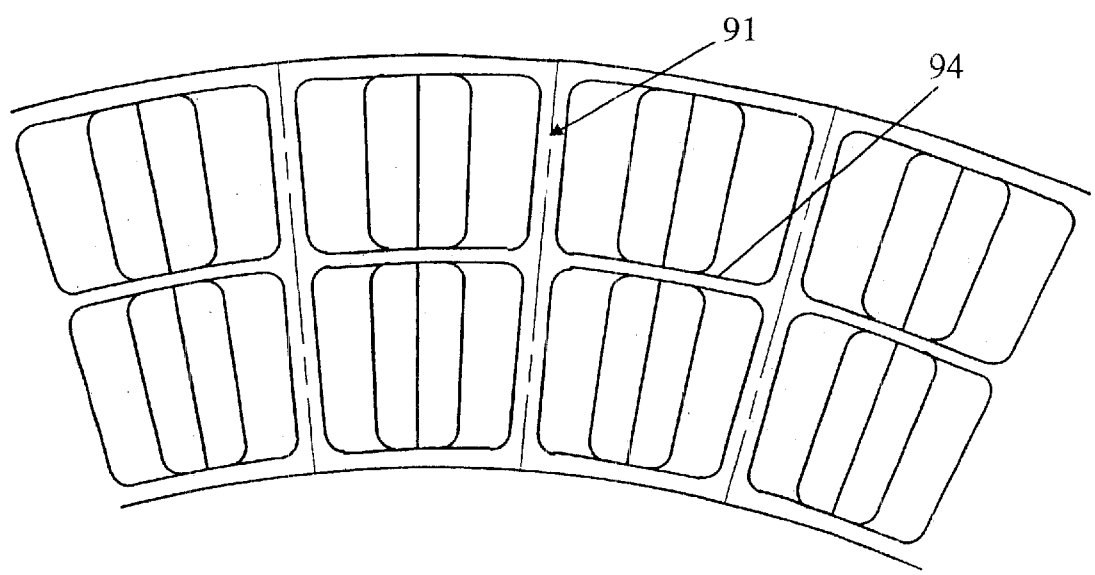
FIG. 11 is a side view a support whose annular body comprises a center web.

FIG. 11 represents an axial view of a support with a support member 91 as described in FIG. 10, but containing, in addition, a continuous circumferential web 94 placed at mid-height of the annular body. The cylindrical-shaped circumferential web 94 has the advantage of introducing a very appreciable increase, on the order of a factor of four, in the limiting buckling load of the structure.

As already explained, it has been observed that the lifetime of the running supports is closely linked to their stress conditions. When the load borne by the supports results in the appearance of a buckling strain, that repeated strain is often the cause of their destruction. The buckling load of the structure of a support can be defined as the maximum load the support is capable of bearing under a radial load without deformation on extension of its annular body.

The three structural shapes presented in FIGS. 3, 4 and 8 are compared below on the basis of the following common data:

| | |
|---|---|
| Outer shape of the support | cylindrical |
| Axial width of support | 80 mm |
| Inner diameter of support | 486 mm |
| Outer diameter of support | 586 mm |
| Thickness of base | 3 mm |
| Thickness of crown | 2 mm |
| Height of structure | 45 mm |
| Number of patterns | 48 |
| Material modulus | 41 MPa |
| Mass density of material | 1,100 kg/m$^3$ |

The results obtained are as follows:

TABLE 1

| Shape | Support weight | Buckling load | Load/weight ratio |
|---|---|---|---|
| FIG. 3 | 1.96 kg | 310 daN | 158 |
| FIG. 4 | 2.04 kg | 390 daN | 191 |
| FIG. 8 | 1.95 kg | 580 daN | 297 |

This table well illustrates the increase of buckling load afforded by the inventive means described herein.

All of the support members and the annular bodies described are attainable by molding techniques suited to their constituent materials. Preferably, they do not contain any undercut part in order to facilitate axial stripping.

What is claimed is:

1. A run flat safety support intended to be mounted on a wheel rim inside a tire equipping a vehicle for supporting the tire tread in case of loss of inflation pressure, comprising:

a generally cylindrical base intended to fit around the rim;

a generally cylindrical crown intended to come in contact with the interior of the tire tread in the event of the loss of inflation pressure, and leaving a clearance from the tire tread interior at nominal pressure;

an annular body connecting the base and the crown, the annular body including a circumferentially continuous support member having a circumferential median plane P; and the support member including a plurality of partitions extending axially on both sides of the circumferential median plane and distributed about the circumference of the support member, and connecting members extending generally circumferentially and joining the two laterally adjacent ends of circumferentially adjacent partitions, the connecting members being successively arranged alternately on both sides of the partitions, and wherein the ratio between the thickness of the partitions in their central part H to the thickness in the lateral ends thereof h is greater than 1.1, in order to reinforce the buckling resistance under a radial load of the annular body.

2. The support according to claim 1, wherein said ratio is greater than 1.5.

3. The support according to claim 1, wherein the partitions include, from one lateral end to the other, at least one reversal of direction of their curvature.

4. A run flat safety support intended to be mounted on a wheel rim inside a tire equipping a vehicle for supporting the tire tread in case of loss of inflation pressure, comprising:

a generally cylindrical base intended to fit around the rim;

a generally cylindrical crown intended to come in contact with the interior of the tire tread in the event of the loss of inflation pressure, and leaving a clearance from the tire tread interior at nominal pressure;

an annular body connecting the base and the crown, the annular body including a circumferentially continuous support member having a circumferential median plane P; and the support member including a plurality of partitions extending axially on both sides of the circumferential median plane and distributed about the circumference of the support member, and connecting members extending generally circumferentially and joining the two laterally adjacent ends of circumferentially adjacent partitions, the connecting members being successively arranged alternately on both sides of the partitions, and wherein the partitions include, from one lateral end to the other, at least one reversal of direction of their curvature, in order to reinforce the buckling resistance under a radial load of the annular body.

5. The support according to claim 1 or 4, wherein the partitions include a central part extending generally axially between two lateral end parts, the lateral end parts joining the connecting members by forming an angle γ with the circumferential direction ranging between 20 and 40 degrees.

6. The support according to claim 1 or 4, wherein the partitions include, from one lateral end to the other, at least three reversals of direction of their curvature.

7. The support according to claim 1 or 4, wherein the partitions include, in their central zone, two parts appreciably extending generally axially and being circumferentially offset from each other, and a third connecting part interconnecting the two parts of generally axial orientation.

8. The support according to claim 7, in which the mean orientation variation α between the third connecting part and the two parts of generally axial orientation is greater than 20 degrees.

9. The support according to claim 1 or 4, wherein, on one axial side of the support member, each connecting member is in contact with at least one axial wall.

10. The support according to claim 1 or 4, wherein, on both sides of the support member, each connecting member is in contact with at least one axial wall.

11. The support according to claim 9, wherein each connecting member forms, with the axial wall backing it and the lateral ends of the two adjacent partitions, a star-shaped assembly with three branches.

12. The support according to claim 10, wherein each connecting member forms, with the axial wall backing it and the lateral ends of the two adjacent partitions, a star-shaped assembly with three branches.

13. The support according to claim 9, wherein the axial width of each axial wall is less than or equal to half the axial width of the two adjacent partitions of the support member.

14. The support according to claim 10, wherein the axial width of each axial wall is less than or equal to half the axial width of the two adjacent partitions of said support member.

15. The support according to claim 1 or 4, wherein the support member further includes a generally cylindrical web coaxial with the support and located at a radially intermediate position of the support member.

16. The support according to claim 15, wherein the cylindrical web is located substantially at mid-height of the support member.

* * * * *

UNITED STATES PATENT AND TRADEMARK OFFICE
CERTIFICATE OF CORRECTION

PATENT NO. : 6,564,842 B2  Page 1 of 1
DATED : May 20, 2003
INVENTOR(S) : Abinal et al.

It is certified that error appears in the above-identified patent and that said Letters Patent is hereby corrected as shown below:

Title page,
Item [75], Inventor(s): "Sebastien Drap" should read -- Sébastien Drap --; and
"Francois Hottebart" should read -- François Hottebart --
Item [63], Related U.S. Application Data: "May 5, 2000" should read -- June 5, 2000 --

Signed and Sealed this

Twenty-first Day of October, 2003

JAMES E. ROGAN
*Director of the United States Patent and Trademark Office*